(12) United States Patent
Tanaka

(10) Patent No.: US 11,347,229 B2
(45) Date of Patent: May 31, 2022

(54) INFORMATION MANAGEMENT DEVICE

(71) Applicant: Hitachi Automotive Systems, Ltd., Hitachinaka (JP)

(72) Inventor: Yuya Tanaka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 160 days.

(21) Appl. No.: 16/615,704

(22) PCT Filed: Jun. 19, 2018

(86) PCT No.: PCT/JP2018/023192
§ 371 (c)(1),
(2) Date: Nov. 21, 2019

(87) PCT Pub. No.: WO2019/003992
PCT Pub. Date: Jan. 3, 2019

(65) Prior Publication Data
US 2020/0225677 A1 Jul. 16, 2020

(30) Foreign Application Priority Data
Jun. 30, 2017 (JP) .............................. JP2017-128817

(51) Int. Cl.
*G05D 1/02* (2020.01)
*G01C 21/34* (2006.01)

(52) U.S. Cl.
CPC ....... *G05D 1/0223* (2013.01); *G01C 21/3492* (2013.01); *G05D 1/0274* (2013.01)

(58) Field of Classification Search
CPC .............. G05D 1/0223; G05D 1/0274; G01C 21/3415; G01C 21/3492; G01C 21/367; G09B 29/10
See application file for complete search history.

(56) References Cited

U.S. PATENT DOCUMENTS

2005/0256639 A1* 11/2005 Aleksic ............ G08G 1/096866
701/414
2007/0156334 A1* 7/2007 Vu ..................... G01C 21/3415
701/416
(Continued)

FOREIGN PATENT DOCUMENTS

JP  9-35183 A  2/1997
JP  2000-136939 A  5/2000
(Continued)

OTHER PUBLICATIONS

International Search Report (PCT/ISA/210) issued in PCT Application No. PCT/JP2018/023192 dated Oct. 9, 2018 with English translation (three (3) pages).
(Continued)

*Primary Examiner* — Rami Khatib
*Assistant Examiner* — Gabriel J Lambert
(74) *Attorney, Agent, or Firm* — Crowell & Moring LLP

(57) ABSTRACT

The purpose of this invention is to be able to appropriately calculate the range of surrounding roads which needs to be provided for a preset travel route. This information management device is equipped with a travel range specifying unit which specifies the travel range which is the range of roads on which a vehicle may travel if having deviated from a preset planned route. The travel range specifying unit calculates the travel range on the basis of the time required to recalculate the planned route, and the speed of the vehicle.

4 Claims, 11 Drawing Sheets

(56) References Cited

U.S. PATENT DOCUMENTS

| | | | | |
|---|---|---|---|---|
| 2011/0196601 | A1* | 8/2011 | Miura | G01C 21/3697 |
| | | | | 701/532 |
| 2013/0261967 | A1 | 10/2013 | Shinagawa et al. | |
| 2014/0097955 | A1 | 4/2014 | Lovitt et al. | |
| 2017/0261984 | A1* | 9/2017 | Ichikawa | G05D 1/0061 |
| 2017/0261987 | A1 | 9/2017 | Takahashi et al. | |
| 2018/0102002 | A1* | 4/2018 | Ohta | G01D 7/02 |

FOREIGN PATENT DOCUMENTS

| | | |
|---|---|---|
| JP | 2011-112627 A | 6/2011 |
| JP | 2013-205256 A | 10/2013 |
| WO | WO 2016/042978 A1 | 3/2016 |

OTHER PUBLICATIONS

Japanese-language Written Opinion (PCT/ISA/237) issued in PCT Application No. PCT/JP2018/023192 dated Oct. 9, 2018 (three (3) pages).

Tsukamoto et al., "Development and Evaluation of a Spatial Database Retrieval System to Provide Neighborhood Information to Moving Objects," The Transactions of the Institute of Electronics, Information and Communication Engineers, Feb. 1, 2004, pp. 202-215, vol. J87-D-I, No. 2, with English abstract (17 pages).

Japanese-language Office Action issued in Japanese Application No. 2019-526815 dated Apr. 27, 2021 with partial English translation (15 pages).

Hiroto Sakahara et al., "Real Time Motion Planning in Dynamic Environment Containing Moving Obstacles Using Spatiotemporal RRT", vol. 43 No. 4 Transactions of the Society of Instrument and Control Engineers, 2007 (nine (9) pages).

Liang Ma et al., "Efficient Sampling-Based Motion Planning for On-Road Autonomous Driving", IEEE Transactions on Intelligent Transportation Systems, Aug. 2015, vol. 16 No. 4, pp. 1961-1976 (17 pages).

Kiyohiro Goto et al., "Motion Planning of an Autonomous Mobile Robot Considering Regions with Velocity Constraints", Journal of the Robotics Society of Japan, The Robotics Society of Japan, 2010, vol. 28, No. 8, pp. 930-937 (eight (8) pages).

Alves, D. de Lima et al., "A Hybrid Controller for Vision-Based Navigation of Autonomous Vehicles in Urban Environments", IEEE Transactions on Intelligent Transpoilalion Systems, vol. 17, No. 8, pp. 2310-2323, 2016 (15 pages).

* cited by examiner

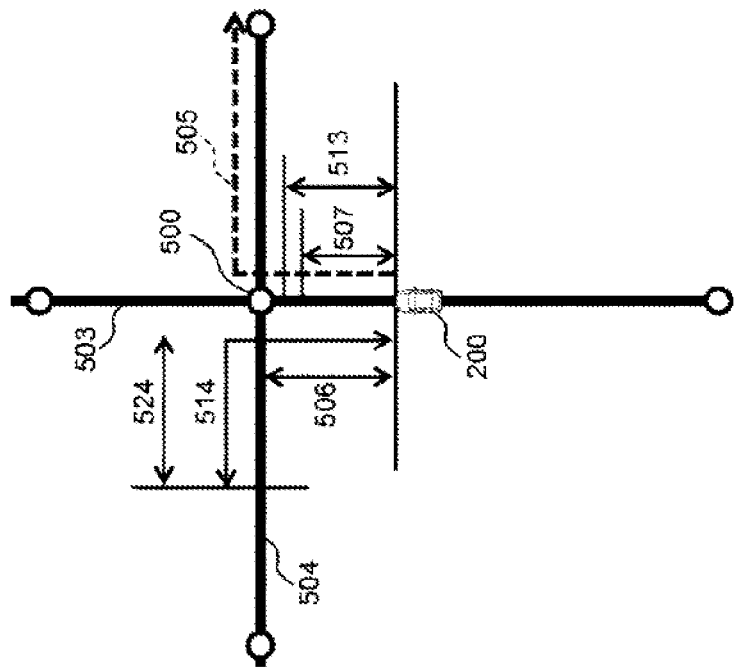
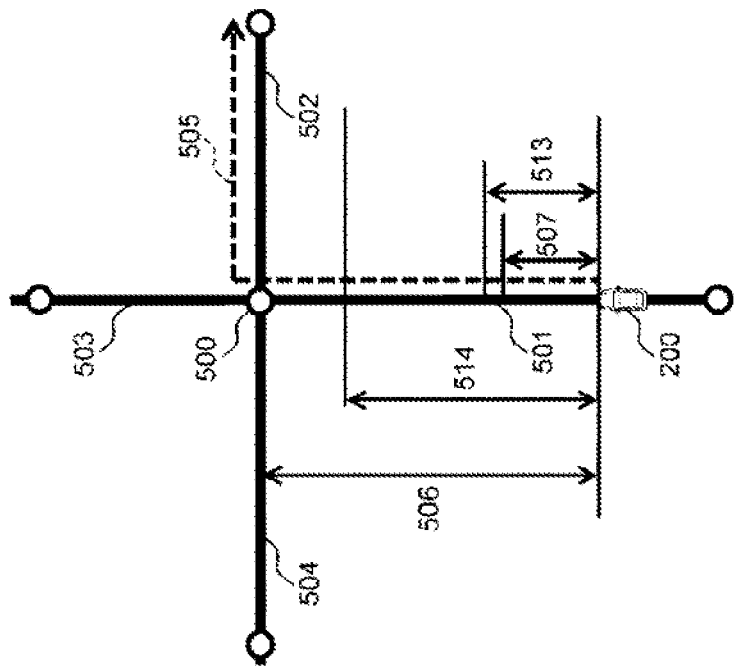

INFORMATION MANAGEMENT DEVICE

TECHNICAL FIELD

The present invention relates to an information management device.

BACKGROUND ART

In recent years, a system has been developed which plans a route to a destination in advance, and continues automatic driving even when the vehicle deviates from one planned route during traveling. When automatic driving on general roads to which the present invention is applied is considered, surrounding conditions such as closure of a road due to sudden construction or disaster and traffic congestion, and the operation of the driver increase conditions under which the vehicle deviates from a route. Thus, the continuity of automatic driving is an important factor in eliminating the inconvenience of the driver resuming automatic driving. In conventional navigation systems, after deviation from a planned route, a new route is replanned by route generation, and until the route replanning is completed, there is no route to travel. Thus, when there is no route, the route following function of automatic driving is disabled.

PTL 1 discloses a driving assistance device that includes a surrounding environment information acquisition unit for recognizing vehicle surrounding environment information, and an automatic driving control unit for automatically driving the vehicle along a preset route without operation of the occupant, based on the vehicle surrounding environment information recognized by the surrounding environment information acquisition unit, the driving assistance device further including a left- or right-turn intention detection unit for detecting the occupant's left- or right-turn intention to change from the preset route to another route, in which the automatic driving control unit changes the route in a left-turn direction or a right-turn direction indicated by the left- or right-turn intention when the left- or right-turn intention detection unit detects the occupant's left- or right-turn intention, to continue the automatic driving.

CITATION LIST

Patent Literature

PTL 1: WO 2016/042978 A

SUMMARY OF INVENTION

Technical Problem

The invention described in PTL 1 cannot properly calculate a range of roads around a preset travel route which needs to be provided.

Solution to Problem

An information management device according to a first mode of the present invention includes a travel range specifying unit that specifies a travel range that is a range that a vehicle can travel off a preset planned route, in which the travel range specifying unit calculates the travel range based on a time required to recalculate the planned route and a speed of the vehicle.

Advantageous Effects of Invention

According to the present invention, a range of roads around a preset travel route which needs to be provided can be properly calculated.

BRIEF DESCRIPTION OF DRAWINGS

FIGS. 6A and 6B are diagrams for explaining whether or not to provide map information.

DESCRIPTION OF EMBODIMENTS

First Embodiment

Hereinafter, with reference to FIGS. 1 to 7, a first embodiment of a vehicle surrounding information management device that is an information management device will be described.

(Outline of Operation)

An outline of an operation of a vehicle surrounding information management device 1 in the present embodiment will be described with reference to FIGS. 1 and 2. In order to enable automatic driving, high-accuracy position information is required, and thus various information on roads on which the vehicle travels (hereinafter, "road information") is required. An autonomous driving vehicle plans a route to travel in advance, and reads road information on the planned route (hereinafter, a "planned route") while traveling. However, if road information other than the planned route is not read at all, automatic driving is disabled when the planned route cannot be traveled for some reason. Thus, it is necessary to read road information on roads other than the planned route (hereinafter, "surrounding road information").

Figure 1:
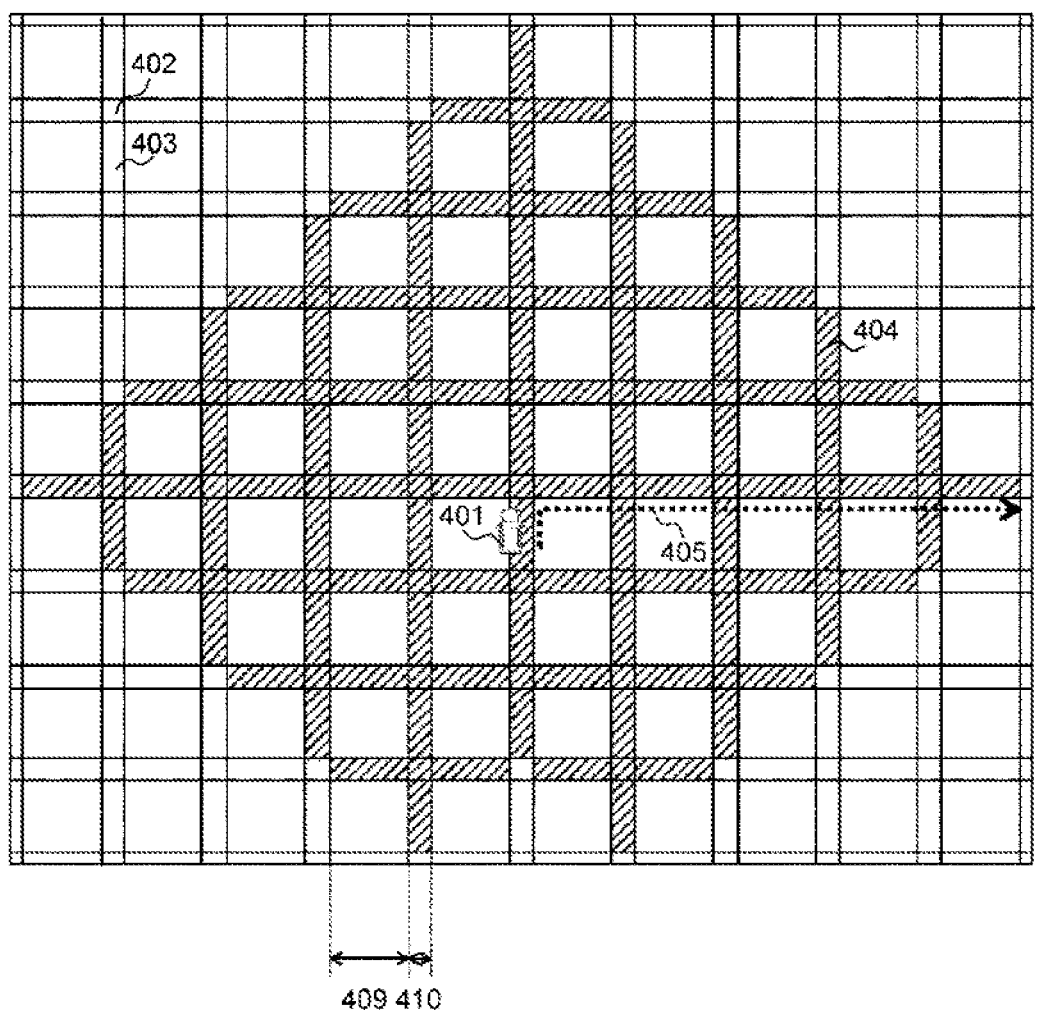
FIG. 1 is a diagram illustrating a read range of road information according to a comparative example.
Figure 2:
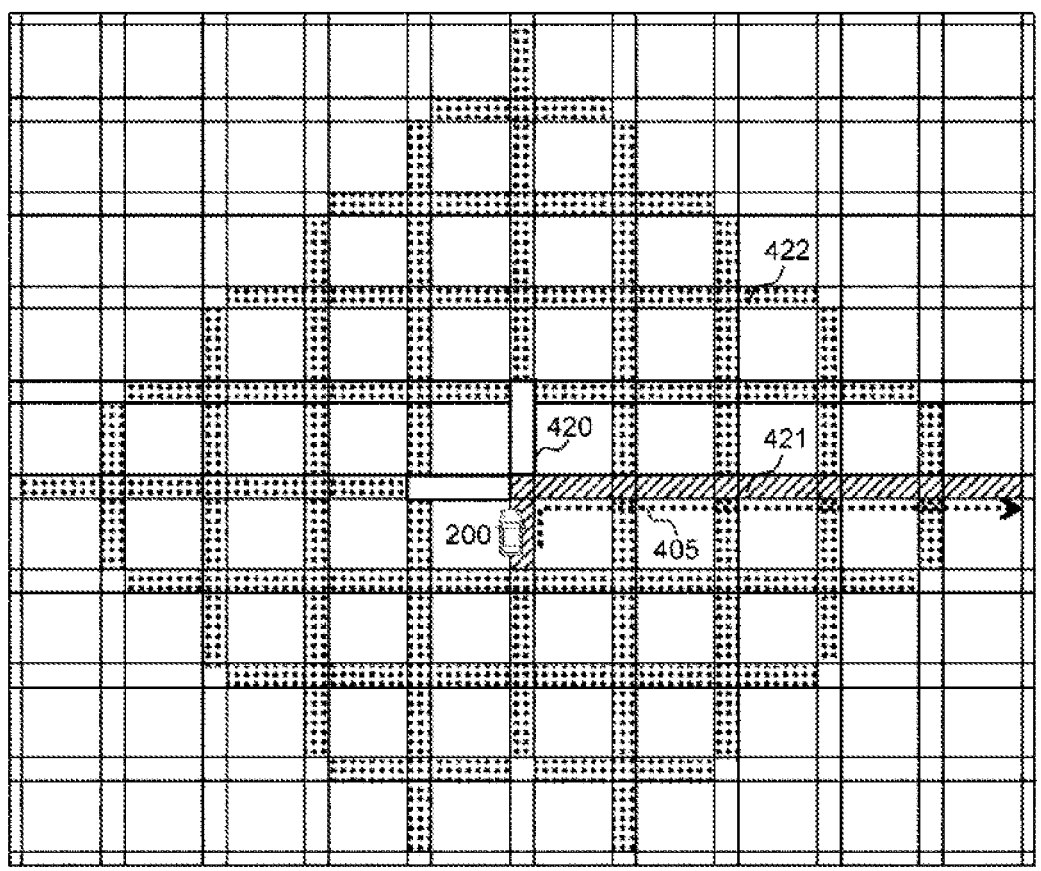
FIG. 2 is a diagram illustrating a read range of road information in a first embodiment.

FIG. 1 is a diagram illustrating a read range of road information according to a comparative example, and FIG. 2 is a diagram illustrating a read range of road information in the present embodiment. The roads illustrated in FIGS. 1 and 2 are identical. These roads include intersections 402 of four roads and road sections 403 connecting between the intersections. In FIGS. 1 and 2, road sections with a road section length 409 of length M and intersections with an intersection length 410 of length N appear repeatedly in a grid. In FIGS. 1 and 2, a reference numeral 405 indicated by a broken line indicates a planned route.

In the comparative example, as shown by hatching in FIG. 1, road information within a certain range centered around a vehicle 401 is read. The example illustrated in FIG. 1 shows that, when expressed using length M of the road section length 409 and length N of the intersection length 410, road information on a range of certain distance range L=5·(M+N) is read. For example, if M=100 m and N=20 m, the range L is 600 m. Consequently, there is a possibility that road information to be read is enormous and the memory capacity is insufficient, or the device becomes expensive in proportion to the required amount of memory capacity.

Thus, in the present embodiment, as illustrated in FIG. 2, not only road information along the planned route 405 of the vehicle 200 is read, but also road information on roads adjacent to the planned route 405 is read as surrounding road information. In FIG. 2, an area with reference numeral 421 shown by hatching shows a road on the planned route 405, and areas with reference numeral 420 shown in solid white show a range included in the surrounding road information. Areas shown by shading of dots in FIG. 2 are areas that are read in FIG. 1 but not read in FIG. 2. In the first embodiment described below, whether the vehicle surrounding information management device 1 provides surrounding road information, and how it determines a range to be included in surrounding road information will be specifically described. The present embodiment does not specifically mention the reading of information on a planned route.

(Configuration)

Figure 3:
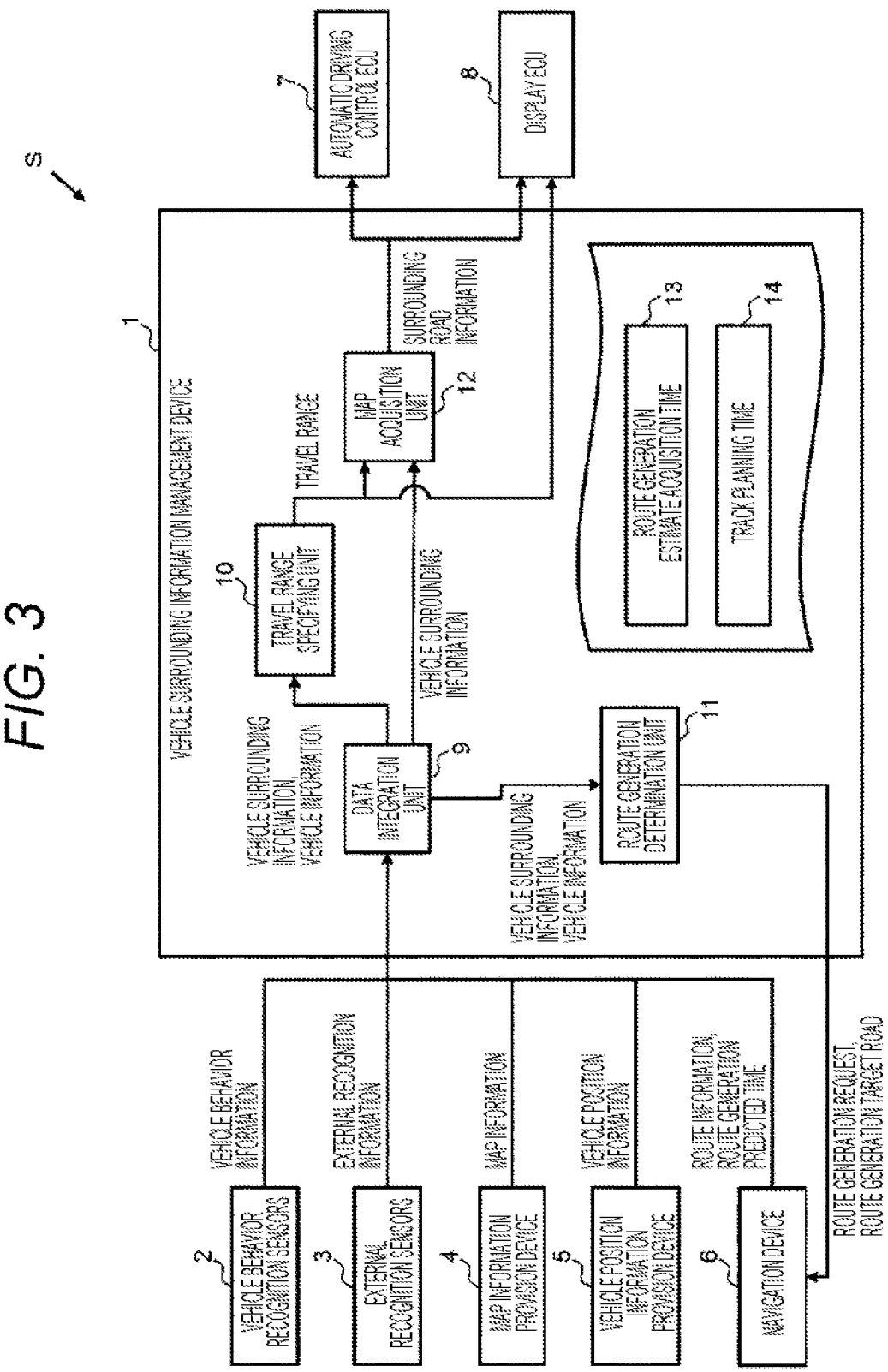
FIG. 3 is a system configuration diagram of an in-vehicle system S in the first embodiment.

FIG. 3 is a system configuration diagram of an in-vehicle system S using the vehicle surrounding information management device 1. The in-vehicle system S is mounted on a vehicle 200. Note that hereinafter, the vehicle 200 is also referred to as the own vehicle 200 to distinguish it from other vehicles. FIG. 3 illustrates the configuration of information acquisition devices that are information sources from which the vehicle surrounding information management device 1 acquires information, and information provision destinations to which the vehicle surrounding information management device 1 provides information. The in-vehicle system S includes the vehicle surrounding information management device 1, and vehicle behavior recognition sensors 2, external recognition sensors 3, a map information provision device 4, a vehicle position information provision device 5, and a navigation device 6, which are the information acquisition devices, and an automatic driving control ECU 7 and a display ECU 8, which are the information provision destinations.

The vehicle surrounding information management device 1 includes a CPU, ROM, and RAM (not illustrated). The CPU implements functions to be described later by developing programs stored in the ROM in the RAM and executing them. The vehicle surrounding information management device 1 integrates and manages information acquired from the information acquisition devices, specifically, vehicle behavior information acquired from the vehicle behavior recognition sensors 2, external recognition information such as external objects/obstacles and road signs acquired from the external recognition sensors 3, map information such as road shapes and road signs acquired from the map information provision device 4, vehicle position information acquired from the vehicle position information provision device 5, and information on a planned route and a route generation predicted time acquired from the navigation device 6. The vehicle surrounding information management device 1 narrows down these pieces of information it manages to generate surrounding road information on surrounding roads of the own vehicle 200, and delivers the surrounding road information to the automatic driving control ECU 7 and the display ECU 8 as the information provision destinations. Information acquisition devices other than those illustrated in FIG. 3 may be included, such as an in-vehicle device that is mounted on another vehicle and transmits information on the other vehicle to the vehicle surrounding information management device 1 by inter-vehicle communication, and a center that transmits various information to the vehicle surrounding information management device 1 by communication via the Internet or a mobile phone network. Also, information provision destinations other than the automatic driving control ECU 7 and the display ECU 8 may be added.

The vehicle behavior recognition sensors 2 include a gyro sensor, a vehicle speed sensor, a steering angle sensor, and an acceleration sensor mounted on the own vehicle 200. The vehicle behavior recognition sensors 2 output the yaw rate, the vehicle speed, the steering angle, and the acceleration representing the behavior of the own vehicle 200 to the vehicle surrounding information management device 1. The external recognition sensors 3 include sensors such as a camera and a radar. The external recognition sensors 3 acquire relative positions of an object, an obstacle, a road sign, etc. around the own vehicle 200, and output them to the vehicle surrounding information management device 1. The information acquired by the external recognition sensors 3 is used, for example, for vehicle route calculation by the automatic driving control ECU 7. Further, the information acquired by the external recognition sensors 3 is also used in the route generation determination unit 11 described later to determine whether a route in front of the own vehicle 200 can be traveled.

The map information provision device 4 provides map information on roads in a range of some kilometers around the own vehicle 200 to the vehicle surrounding information management device 1. The map information provision device 4 may include a storage device in which the map information is stored, or may acquire the map information by communication. The map information delivered includes, for example, speed limit information, road curvature and gradient, road width, the number of lanes, fork positions, junction positions, intersection information, pedestrian crossing information, stop line information, and lane connection information. The map information provision device 4 may acquire traffic congestion information or the like from VICS (registered trademark), and provide it to the vehicle surrounding information management device 1 as it is or after integrating it with other information. In the present embodiment, the map information provision device 4 provides map information with reference to nodes and links. A node is a connection point such as an intersection or a fork, and a link is a road section between nodes. In the present embodiment, nodes and links are used for explanation simply for convenience. The map information may be provided without using nodes and links.

The vehicle position information provision device 5 includes a so-called GPS receiver that receives signals from a plurality of satellites constituting a satellite navigation system, and calculates the position of the own vehicle 200 using information contained in the signals. The vehicle position information provision device 5 outputs information indicating the calculated vehicle position, that is, the latitude and longitude of the own vehicle 200, to the vehicle surrounding information management device 1. Note that the vehicle position information provision device 5 may estimate the vehicle position and the traveling direction of the vehicle, referring to the speed, the yaw rate, the steering angle, etc. of the own vehicle 200, to improve the accuracy of the vehicle position. The vehicle position output by the vehicle position information provision device 5 serves as a reference point when map information is used, and affects the position accuracy of map information to the information provision destinations.

The navigation device 6 includes a CPU, ROM, and RAM (not illustrated). The CPU implements a route generation function, a generation time estimation function, and a route information provision function by developing and executing programs stored in the ROM in the RAM. The route generation function is a function to generate, when a link to be traveled by the vehicle 200 is specified from the vehicle surrounding information management device 1 as information specifying a route generation target road, a route to a preset destination through the link. In the following, the next link to be traveled described above is also referred to as a "route generation target road." The route information provision function is a function to provide information on the generated route to the vehicle surrounding information management device 1.

The generation time estimation function is a function to estimate the time required to execute the route generation function, and is executed after a link (route generation target road) is specified from the vehicle surrounding information management device 1, like the route generation function. For example, considering calculation of the shortest route using Dijkstra's algorithm in route generation processing, the order of calculation amount until the shortest route is calculated is expressed as $O(V^2)$ in big O notation where V is defined as the number of nodes in map information used for calculation of the shortest route. In the generation time estimation function, first, it is calculated how many nodes are present up to the destination for a route generation target road received from the vehicle surrounding information management device 1. Next, using a predetermined single search time required for search per node depending on the processing capacity of the navigation device 6, the calculation amount is estimated using the product of the square of the number of nodes and the single search time, and a route generation predicted time is transmitted.

The navigation device 6 stores route information created in advance, and by the route information provision function, provides the vehicle surrounding information management device 1 with guidance information on roads to be traveled by the own vehicle 200 along the route information to the destination set by the driver. When the navigation device 6 receives a route generation request and information on a route generation target road from the vehicle surrounding information management device 1, by the generation time estimation function, it first calculates a route generation predicted time until it generates new route information, and outputs the calculated route generation predicted time to the vehicle surrounding information management device 1. Then, by the route generation function, the navigation device 6 searches for a route from the route generation target road to the destination, and creates route information. Note that calculation of a route generation predicted time and creation of route information may be performed in parallel. A route generation request, a route generation target road, and a route generation predicted time are all calculated for each route generation destination road, that is, for each link. For example, when there is a plurality of route generation target roads, a route generation request, a route generation target road, and a route generation predicted time are calculated for each road.

A route generation request is output from the vehicle surrounding information management device 1 to the navigation device 6 when it becomes clear that the own vehicle 200 cannot travel along the planned route. For example, when the vehicle surrounding information management device 1 determines from vehicle surrounding information and vehicle information that the vehicle will travel a road adjacent to the planned route due to suspension of traffic or the operation of the driver, it outputs a route generation request. The vehicle surrounding information here includes integrated information of object/obstacle information detected by the external recognition sensors 3, map information acquired from the map information provision device 4, vehicle position information acquired from the vehicle position information provision device, and route information and a route generation predicted time acquired from the navigation device 6. For the determination of suspension of traffic, it can be acquired from construction information in VICS information or the like. However, when traffic is suspended in close proximity to the vehicle, there is a possibility that only the external recognition sensors 3 can detect it. Depending on conditions under which the route is replanned, route generation may be determined in the navigation device 6. For example, when recognizing that vehicle position information from the vehicle position information provision device 5 has deviated from the planned route by a certain distance, the navigation device 6 starts route generation.

The automatic driving control ECU 7 is an electronic control device for controlling the operation of the own vehicle 200, that is, an electronic control unit (ECU). The automatic driving control ECU 7 operates the steering, the brake, and the accelerator of the own vehicle 200, referring to surrounding road information received from the vehicle surrounding information management device 1, to move the vehicle 200 to the destination. Note that the driver can control the operation of the automatic driving control ECU 7. In that case, the driver may directly operate the steering, the brake, and the accelerator. In the present embodiment, the automatic driving control ECU 7 stores surrounding road information received from the vehicle surrounding information management device 1 in a storage area of the automatic driving control ECU 7, and reads the stored surrounding road information from the storage area of the automatic driving control ECU 7 as needed.

The display ECU 8 is an ECU with a display device. Information on vehicle surroundings is displayed on the display device. The display ECU 8 may change displayed contents and a displayed range based on a travel range received from a travel range specifying unit 10. In the present embodiment, the display ECU 8 stores surrounding road information received from the vehicle surrounding information management device 1 in a storage area of the display ECU 8, and reads the stored surrounding road information from the storage area of the display ECU 8 as necessary.

Next, the internal configuration of the vehicle surrounding information management device 1 will be described. The vehicle surrounding information management device 1 includes a data integration unit 9, the travel range specifying unit 10, a route generation determination unit 11, and a map acquisition unit 12. A route generation estimate acquisition time 13 and a track planning time 14 are stored in ROM (not illustrated) of the vehicle surrounding information management device 1. The route generation estimate acquisition time 13 is a fixed value determined in advance based on a route generation estimation method of the navigation device 6. Note that an average time until the navigation device 6 completes the estimation of the route generation time and the vehicle surrounding information management device 1 receives it may be set as the route generation estimate acquisition time 13. The track planning time 14 is a predetermined fixed value, and, for example, a forward watching time of the driver coming from the idea of driving behavior of lateral movement involving steering for maintaining the lane.

The data integration unit 9 integrates information obtained from the vehicle behavior recognition sensors 2, the external recognition sensors 3, the map information provision device 4, the vehicle position information provision device 5, and the navigation device 6, to generate vehicle surrounding information and vehicle information. The integration of information referred to here is, for example, integration of coordinate systems and update cycles. Integration of coordinate systems is, for example, processing to integrate information represented by an absolute coordinate system with reference to a reference point on the earth, and information represented by a coordinate system with reference to the position of the vehicle, more precisely, the position of a sensor. For integration of the coordinate systems, for example, position information of the vehicle, attitude information indicating the traveling direction, etc. are used. Integration of update cycles is processing, for example, to estimate output values of sensors at a predetermined timing by interpolation processing or the like, in order to solve the problem that update timings of measurement values differ from sensor to sensor. Note that the data integration unit 9 may instruct data acquisition timing to each sensor to make the update timings of measurement values of all the sensors the same.

The travel range specifying unit 10 acquires vehicle surrounding information and vehicle information from the data integration unit 9, and specifies the range of surrounding road information output by the vehicle surrounding information management device 1 as a range that the own vehicle 200 can travel off the planned route (hereinafter, a "travel range"). By setting the travel range, the data amount of surrounding road information output by the map acquisition unit 12 is reduced. The travel range is a range that the own vehicle 200 that has deviated from the planned route will travel while the navigation device 6 is performing route generation, and is a range in which information on a planned route cannot be obtained. Details will be described later.

The route generation determination unit 11 acquires vehicle surrounding information and vehicle information from the data integration unit 9, generates a route generation request and information on a route generation target road, and transmits them to the navigation device 6. For example, if it can be detected by the external recognition sensors 3 that there is a plurality of vehicles on the planned route that the own vehicle 200 is due to travel from now, and the vehicle 200 cannot travel the planned route, the route generation determination unit 11 outputs a route generation request at that point in time. When congestion information is included in route information from the navigation device 6, the route generation determination unit 11 can output a route generation request at a timing before encountering the congestion. The route generation determination unit 11 determines whether the vehicle speed is low based on the vehicle information, determines that the vehicle will deviate from the route when a large steering angle is produced at low speed, and outputs a route generation request. The information on the route generation target road is associated with the route generation request, and is an output for specifying which link is a target of route generation. Thus, the navigation device 6 outputs a route generation predicted time for each route generation target road, and the travel range specifying unit 10 can determine a travel range for each road. In addition, specifying a route generation target road by the route generation determination unit has an effect of preventing route generation for a road on which the vehicle is not planned to travel.

The map acquisition unit 12 acquires map information included in vehicle surrounding information from the data integration unit 9, and acquires a travel range from the travel range specifying unit 10. The map acquisition unit 12 specifies a final map provision range based on the acquired travel range. Based on the specified range, the map acquisition unit 12 narrows down the map information, and outputs it to the automatic driving ECU 7 and the display ECU 8 as surrounding road information.

(Details of Travel Range Specifying Unit)

Figure 4:
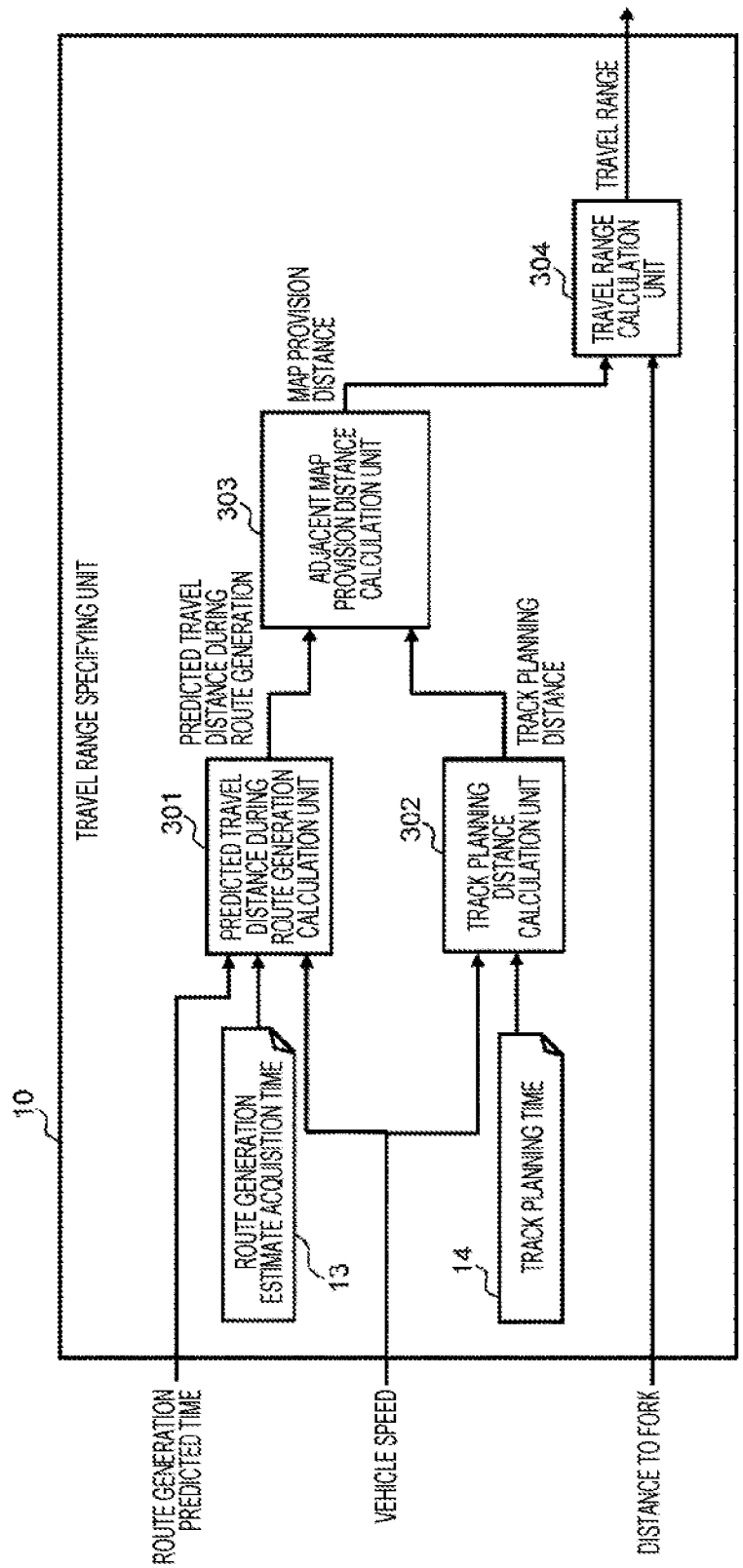
FIG. 4 is a diagram illustrating the detailed configuration of a travel range specifying unit 10.

FIG. 4 is a diagram illustrating the detailed configuration of the travel range specifying unit 10. The travel range specifying unit 10 includes a predicted travel distance during route generation calculation unit 301, a track planning distance calculation unit 302, an adjacent map provision distance calculation unit 303, and a travel range calculation unit 304.

The predicted travel distance during route generation calculation unit 301 multiplies a route generation predicted time acquired from the navigation device 6 by the vehicle speed to calculate a predicted travel distance during route generation. The predicted travel distance during route generation is a distance that will be traveled by the vehicle while the navigation device 6 is executing route generation. However, if a route generation request is transmitted from the vehicle surrounding information management device 1 to the navigation device 6, a route generation predicted time is not immediately obtained. Therefore, between the transmission of a route generation request and the acquisition of a route generation predicted time, the travel range specifying unit 10 reads the route generation estimate acquisition time 13 stored in advance in the ROM (not illustrated), multiplies the route generation estimate acquisition time 13 by the vehicle speed, and uses this value as a substitute distance for a predicted travel distance during route generation.

The track planning distance calculation unit 302 multiplies the preset track planning time 14 by the vehicle speed to calculate a track planning distance. The track planning distance is the minimum required distance for the automatic driving control ECU 7 to start automatic driving for a road for which a track is planned. The adjacent map provision distance calculation unit 303 compares a predicted travel distance during route generation calculated by the predicted travel distance during route generation calculation unit 301 with a track planning distance calculated by the track planning distance calculation unit 302, and selects the longer distance. The selected distance is output to the travel range calculation unit 304 as a map provision distance.

The travel range calculation unit 304 subtracts a distance to the next node from the map provision distance, and outputs the result as a travel range of the own vehicle 200. That is, the relationships between the map provision distance J, the distance to the next node K, and the travel range L are expressed by the following equation (1):

$$L = J - K \qquad (1)$$

The travel range represents a distance traveled by the time a new planned route is created when the own vehicle 200 cannot travel the planned route. That is, in order to continue automatic driving even when the own vehicle 200 travels a route off the planned route by necessity, the vehicle surrounding information management device 1 provides map information corresponding to the travel range to the automatic driving control ECU 7 and the display ECU 8. Thus, when L has a positive value, the vehicle surrounding information management device 1 provides surrounding road information to the automatic driving control ECU 7 and the display ECU 8. The amount of the provided map information is larger as the value of L is larger. Note that the travel range specifying unit 10 may determine a travel range, further considering the lane position in which the own vehicle 200 travels and surrounding conditions.

(Operation Sequence)

Figure 5:
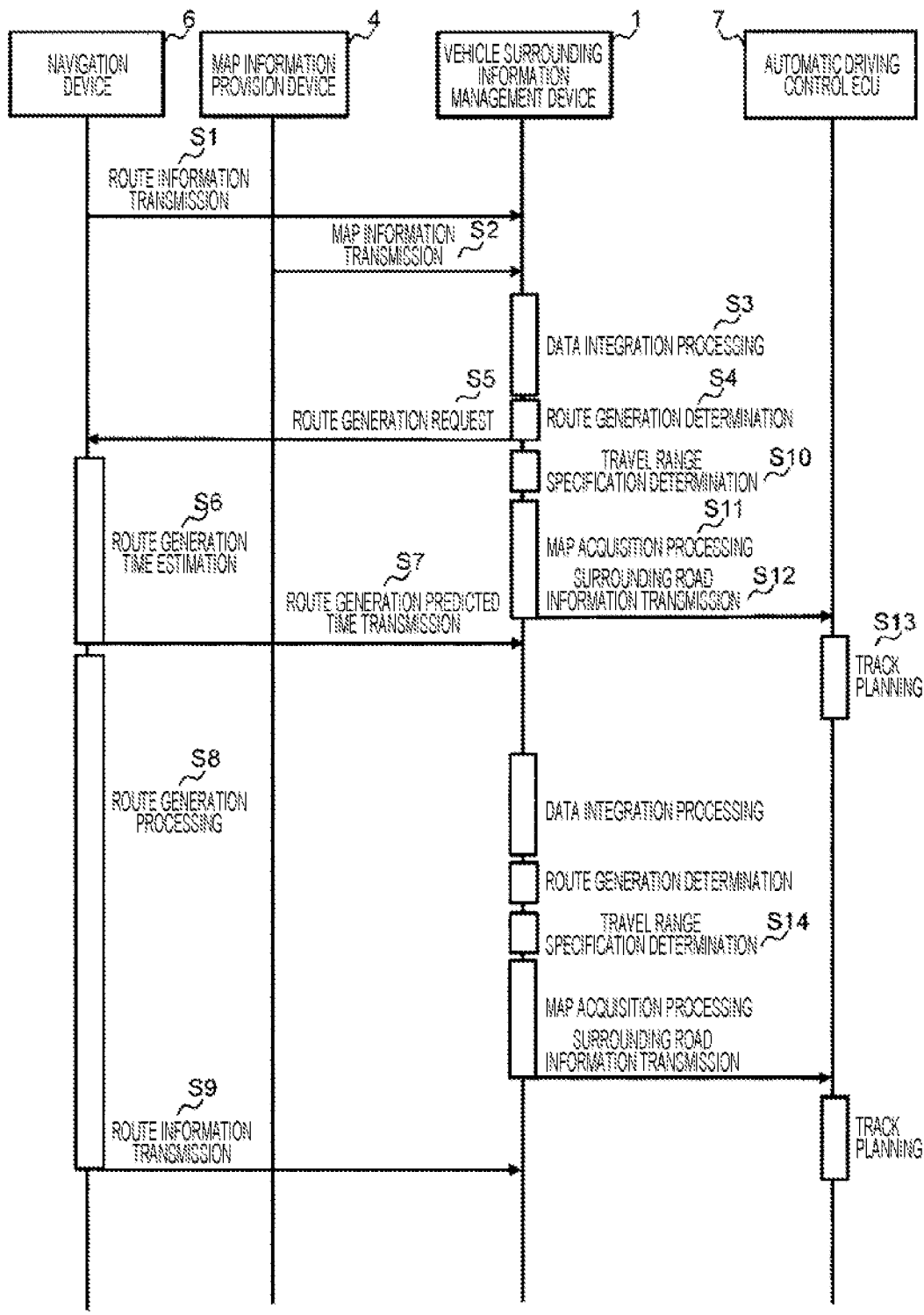
FIG. 5 is a diagram illustrating an operation sequence of a vehicle surrounding information management device 1.

FIG. 5 is a diagram illustrating an operation sequence of the vehicle surrounding information management device 1. First, the navigation device 6 transmits route information to the vehicle surrounding information management device 1 (S1). Next, the map information provision device 4 transmits map information to the vehicle surrounding information management device 1 (S2). It is assumed that the map information includes roads adjacent to a planned route. For the map information acquired this time, some kilometers of map information may be acquired at once, or a difference by a traveled amount may be acquired.

The vehicle surrounding information management device 1 executes data integration processing to integrate the obtained information (S3), and determines whether route generation is necessary by route generation determination based on the integrated data (S4). If the vehicle surrounding information management device 1 determines that route generation is necessary, it transmits a route generation request and information on a route generation target road to the navigation device 6 (S5). The navigation device 6 executes route generation time estimation (S6), and transmits a route generation predicted time to the vehicle surrounding information management device 1 (S7).

If the estimation of the route generation time and its transmission illustrated as S6 and S7 are completed in a short time, the following advantages are obtained. Specifically, if the route generation predicted time is promptly transmitted to the vehicle surrounding information management device 1, a travel range calculated by travel range specification determination (S10) in the vehicle surrounding information management device 1 can be specified at an early timing correspondingly, and minimum required map information can be provided to the automatic driving control ECU 7. When the route generation time estimation (S6) is completed, the navigation device 6 proceeds with route generation processing (S8). The route generation processing may use Dijkstra's algorithm described above, or may use a method that takes a shorter search time. Note that it is desirable that the route generation processing (S8) be a method that allows estimation of a route generation time as described above. When the route generation processing is completed, the navigation device 6 transmits route information again to the vehicle surrounding information management device 1 (S9).

Even if the vehicle surrounding information management device 1 transmits the route generation request (S5), the route generation predicted time is not immediately obtained. Therefore, while the navigation device 6 is executing the route generation time estimation (S6), the vehicle surrounding information management device 1 performs the following processing in S10 to S12. Specifically, the vehicle surrounding information management device 1 reads the route generation estimate acquisition time stored in advance and executes the travel range specification determination (S10), and from an obtained travel range and the planned route, narrows down map information to be provided by map acquisition processing (S11). Then, the vehicle surrounding information management device 1 transmits surrounding road information to the automatic driving control ECU 7 (S12). The automatic driving control ECU 7 that has received the route generation request executes track planning (S13).

The vehicle surrounding information management device 1 repeats the data integration processing (S3) to the map acquisition processing (S11) until the destination is reached. Note that in travel range specification determination (S14) executed after the vehicle surrounding information management device 1 receives the route generation predicted time from the navigation device 6, the received route generation predicted time is used, so that a more accurate travel range can be specified. If the vehicle surrounding information management device 1 can continue automatic driving in a section 203 without the planned route in FIG. 2, it executes the data integration processing and the subsequent processing according to new route information acquired through the transmission of the route information from the navigation device 6 (S9).

Depending on processing load, the navigation device 6 may not complete the route generation processing (S8) within the route generation predicted time. In that case, new route information is not transmitted to the vehicle surrounding information management device 1 (S9), and the automatic driving cannot be continued. Therefore, if the vehicle surrounding information management device 1 determines that the vehicle has deviated from the planned route, based on the vehicle position, it can set the way the road goes as a new route, and provide map information on a replanned route to the automatic driving control ECU 7.

FIG. 6 is a diagram for explaining whether or not to provide map information. FIG. 6(A) is a diagram illustrating a case where the own vehicle 200 is far from an intersection 500, and FIG. 6(B) is a diagram illustrating a case where the own vehicle 200 is near the intersection 500. In FIG. 6, the intersection 500 is a node and is connected to links 501 to 504. A planned route 505 of the vehicle 200 is directed from the link 501 through the intersection 500 to the link 502. In FIG. 6, the distance from the own vehicle 200 to the intersection 500 is indicated by reference numeral 506, and a track planning distance is indicated by reference numeral 507. As described above, a travel range is set for each link, and the travel range of the link 504 is indicated by reference numeral 524. Predicted travel distances during route generation of the link 503 and the link 504 are indicated by reference numerals 513 and 514, respectively.

Assume that in the example illustrated in FIG. 6, the speed of the own vehicle 200 is constant, and the route generation predicted time is constant for each link. Specifically, while the distance 506 from the own vehicle 200 to the node 500 changes as the own vehicle 200 travels, the predicted travel distance during route generation 513 of the link 503 and the predicted travel distance during route generation 514 of the link 504 are constant. Also, since the track planning distance 507 is determined by the track planning time 14 that is a fixed value and the vehicle speed as described above, the track planning distance 507 is constant in the example illustrated in FIG. 6. Further, it has already been found that the link 502 is impassable before the time illustrated in FIG. 6(A).

In the example illustrated in FIG. 6(A), the predicted travel distance during route generation 513 of the link 503 and the predicted travel distance during route generation 514 of the link 504 are larger than the track planning distance 507. Thus, map provision distances of the link 503 and the link 504 are distances indicated by reference numerals 513 and 514, respectively. Then, both of the distances are shorter than the distance 506 from the own vehicle 200 to the intersection 500. Thus, by equation (1), the travel distance L has a negative value for both the link 503 and the link 504. Consequently, in the conditions illustrated in FIG. 6(A), provision of road information is not performed for both the link 503 and the link 504. That is, the travel range of the link 503 and the travel range of the link 504 are zero.

In the example illustrated in FIG. 6(B), the own vehicle 200 has come closer to the intersection 500 than in the conditions illustrated in FIG. 6(A), and thus the distance 506 from the vehicle 200 to the intersection 500 has become smaller. Consequently, the predicted travel distance during route generation 514 of the link 504 is larger than the distance 506 from the own vehicle 200 to the intersection 500, and the travel range 524 of the link 504 has a positive value by equation (1). For the link 504, road information on the distance of the travel range 524 from the node 500 is provided. On the other hand, the predicted travel distance during route generation 513 of the node 503 is smaller than the distance 506 from the own vehicle 200 to the intersection 500 as in the example illustrated in FIG. 6(A). Thus, the travel range of the link 503 is zero, and road information on the link 503 is not provided.

(Flowchart)

Figure 7:
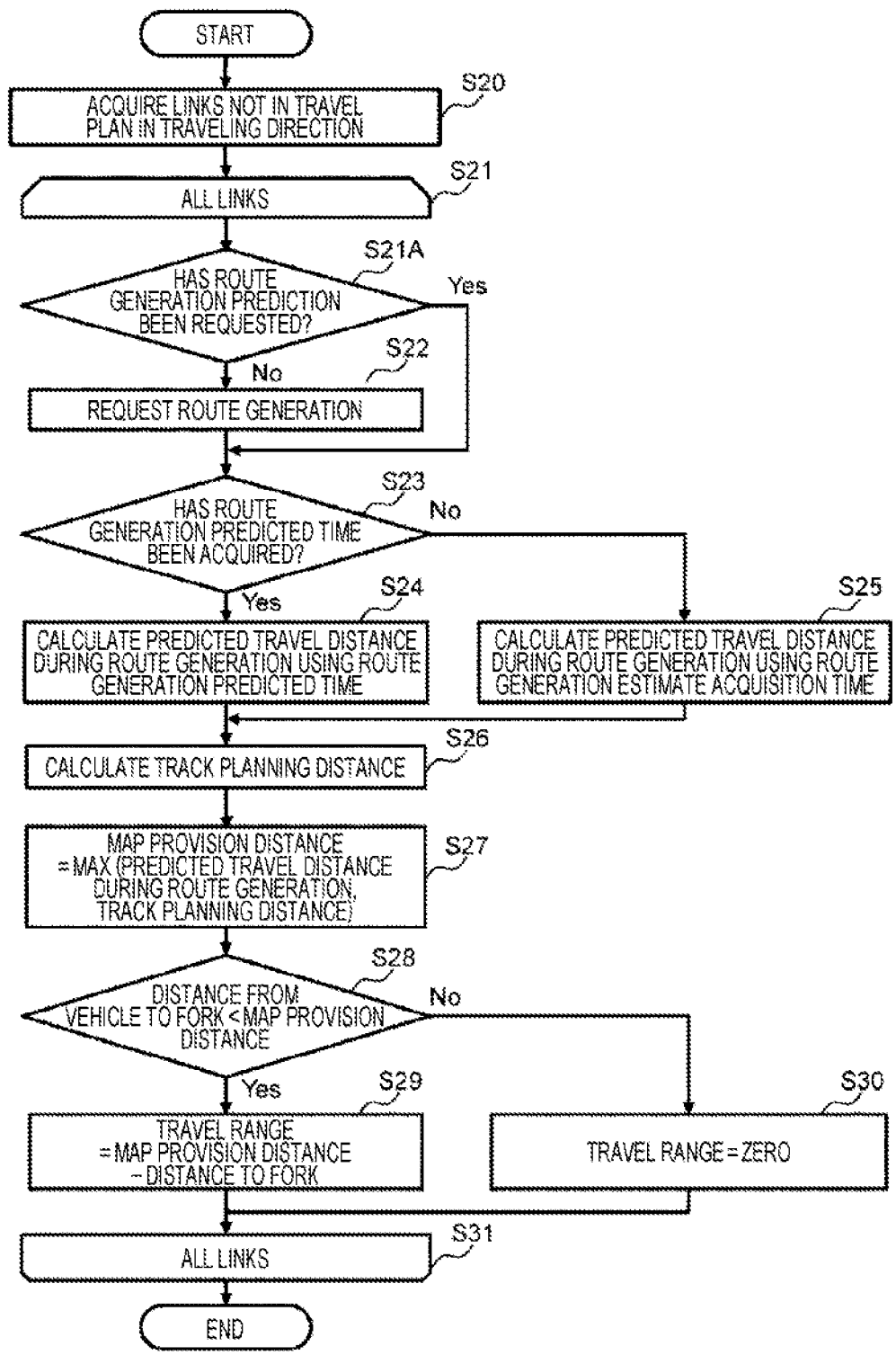
FIG. 7 is a flowchart illustrating processing to calculate a travel range.

FIG. 7 is a flowchart illustrating processing to calculate a travel range. Steps in the flowchart of FIG. 7 described below are mainly executed by the CPU of the vehicle surrounding information management device 1. When it becomes clear that a planned route is impassable, the vehicle surrounding information management device 1 starts the processing described below at predetermined time intervals, for example, every second.

In step S20, the vehicle surrounding information management device 1 acquires links that are located in the traveling direction of the vehicle 200 and are not included in the planned route, and proceeds to step S21. In step S21, the vehicle surrounding information management device 1 executes processing in steps S21A to S30 described below for all the links acquired in S20, changing a processing target link in turn. In step S21A, the vehicle surrounding information management device 1 determines whether a route generation request with a processing target link set as a route generation target road has already been transmitted to the navigation device 6. If it is determined that the request has already been made, the process proceeds to step S23. If it is determined that the request has not yet been made, the process proceeds to step S22. If the request has already been made, a further request causes the navigation device 6 to perform unnecessary processing. To prevent this, the determination in step S21A is performed. In step S22, the vehicle surrounding information management device 1 transmits to the navigation device 6 a route generation request with the processing target link set as a route generation target road, and proceeds to step S23.

In step S23, the vehicle surrounding information management device 1 determines whether a route generation predicted time has been acquired for the processing target link from the navigation device 6. When the vehicle surrounding information management device 1 determines that it has been acquired, it proceeds to step S24 to calculate a predicted travel distance during route generation using the route generation predicted time. If the vehicle surrounding information management device 1 determines that it has not been acquired, it proceeds to step S25 to calculate a predicted travel distance during route generation using the predetermined route generation estimate acquisition time 13. When step S24 or S25 is finished, the vehicle surrounding information management device 1 calculates in step S26 a track planning distance using the predetermined track planning time 14 and the speed of the vehicle 200.

In subsequent step S27, the vehicle surrounding information management device 1 determines a map provision distance as the predicted travel distance during route generation or the track planning distance, whichever is larger. A function MAX in S27 of FIG. 7 is a function that returns the largest value of a plurality of arguments given. In subsequent step S28, the vehicle surrounding information management device 1 determines whether the distance from the vehicle 200 to the next fork, that is, the next node in the traveling direction is smaller than the map provision distance calculated in step S27. If it is determined that the distance from the vehicle 200 to the next fork is smaller than the map provision distance, the process proceeds to step S29. If it is determined that the distance from the vehicle 200 to the next fork is larger than or equal to the map provision distance, the process proceeds to step S30. In step S29, the travel range of the processing target link is calculated as the difference between the map provision range and the distance to the next fork. In step S30, the travel range of the processing target link is set to zero. In step S31, which is executed when execution of step S29 or step S30 is completed, the vehicle surrounding information management device 1 determines whether the processing has been performed on all the links acquired in S20. If it determines that there is a link for which the processing has not been performed, the process returns to step S21A with the link set as a processing target. If the vehicle surrounding information management device 1 determines that the processing has been performed on all the links, it finishes the processing illustrated in FIG. 7.

According to the first embodiment described above, the following functions and effects are obtained.

(1) The vehicle surrounding information management device 1 includes the travel range specifying unit 10 that specifies a travel range that is a range that the vehicle can travel off a preset planned route. The travel range specifying unit 10 calculates a travel range based on the time required to recalculate a planned route and the speed of the vehicle. Therefore, the vehicle surrounding information management device 1 can properly calculate a range of roads around a preset travel route which needs to be provided.

(2) The vehicle surrounding information management device 1 includes the map acquisition unit 12 that transmits surrounding road information on a road in a travel range. Therefore, the vehicle surrounding information management device 1 can properly provide information on roads around a planned route, based on travel ranges calculated by the travel range specifying unit 10.

(3) The predicted travel distance during route generation calculation unit 301 of the travel range specifying unit 10 uses a predetermined value for the calculation of a travel range until the time required to recalculate a planned route is obtained (S25 in FIG. 7). When the time required to recalculate a planned route is obtained, the predicted travel distance during route generation calculation unit 301 calculates a travel range using the time required to recalculate a planned route (S24 in FIG. 7). Thus, the vehicle surrounding information management device 1 can provide information on roads around a planned route with high accuracy, that is, less waste, using a route generation predicted time. Further, even before acquiring a route generation predicted time, the vehicle surrounding information management device 1 can quickly provide information on roads around a planned route using the route generation estimate acquisition time 13.

(4) The adjacent map provision distance calculation unit 303 of the travel range specifying unit 10 sets as a travel range the longer one of a track planning distance obtained by multiplying the track planning time 14 specific to automatic driving of the automatic driving control ECU 7 that is provided with map information from the map acquisition unit 12 to operate, by the vehicle speed, and a predicted travel distance during route generation obtained by multiplying the time required to recalculate a planned route, that is, a route generation predicted time or the route generation estimate acquisition time 13 by the vehicle speed. Thus, information on roads around a planned route can be provided, also taking processing time specific to the application into account.

(5) The travel range calculation unit 304 of the travel range specifying unit 10 calculates a travel range by subtracting a distance along which a planned route overlaps a map provision distance that is the product of the time required to recalculate a planned route and the speed of the vehicle 200, that is, a distance to a fork from the map provision distance.

As in first to third modifications described below, the travel range specifying unit 10 may reduce travel ranges, based on the position of the vehicle 20 on a road on which it travels, the speed of the vehicle 20, and conditions in the traveling direction of the vehicle 20. This can narrow down travel ranges more.

(First modification) The travel range specifying unit 10 may determine a travel range according to the travel position of the vehicle 200.

Figure 8:
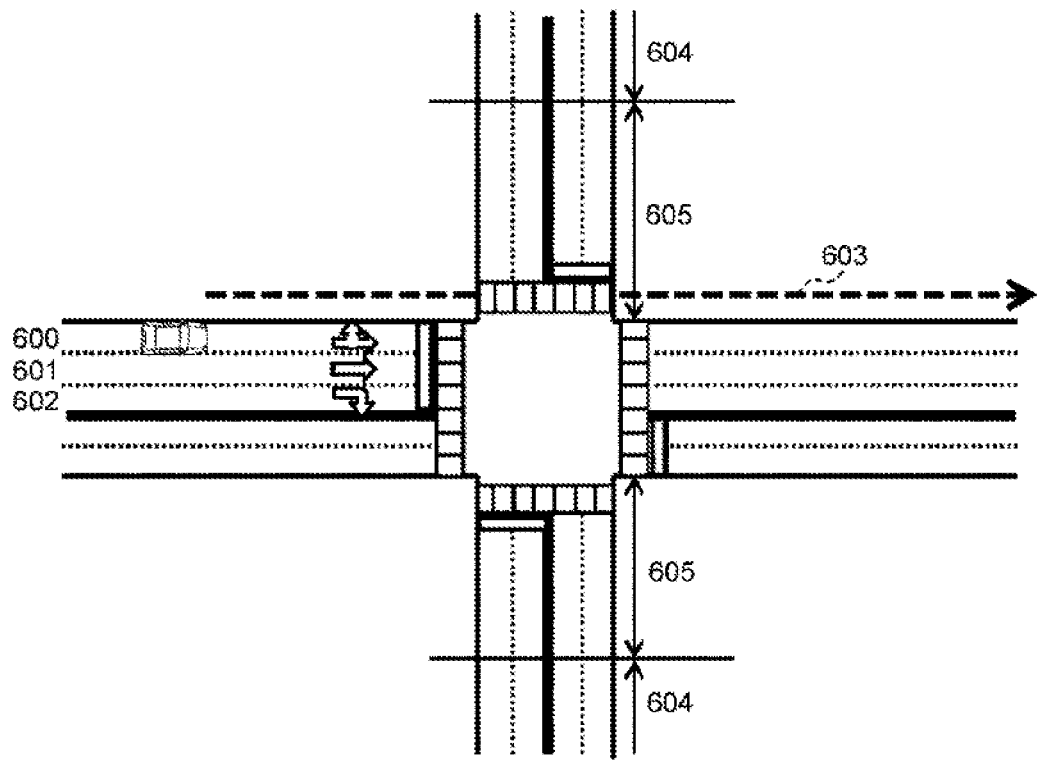
FIG. 8 is a diagram illustrating an operating environment in a first modification.

FIG. 8 is a diagram illustrating an operating environment in a first modification. In FIG. 8, the vehicle 200 is traveling toward an intersection. A road on which the vehicle 200 travels consists of three lanes. The vehicle 200 is traveling in the leftmost lane 600 along a planned route 603. If it has been found in advance that there is suspension of traffic ahead of the intersection before entering the intersection, the vehicle 200 turns left or right at the intersection to travel off the planned route since the vehicle 200 cannot travel along the planned route 603. When the vehicle 200 travels off the planned route, it needs the provision of map information outside the planned route in order to continue automatic driving also during a period until route generation in the navigation device 6 is completed. In FIG. 8, reference numeral 605 denotes a travel range calculated by the travel range calculation unit 304, and reference numeral 604 denotes ranges outside the planned route on which map information is not provided.

At this time, since the vehicle 200 is traveling in the leftmost lane 600, the possibility of using map information on the right-turn side of the intersection is low unless the vehicle 200 changes the lane to a right-turn-only lane 602. If the vehicle 200 is traveling in the right-turn-only lane 602, the possibility of using map information on the left-turn side of the intersection is low. Thus, if map information on the outside of the planned route at the intersection which the vehicle 200 is unlikely to travel is not provided as a travel range, taking the traveling lane position of the vehicle 200 into consideration, the amount of data to be transmitted for control can be further reduced. Therefore, input of the traveling lane position of the vehicle 200 may be added to the travel range calculation unit 304 for processing to narrow down travel ranges. However, if a lane change from the lane 600 to the right-turn-only lane 602 can be detected before the intersection is reached, it is necessary to take a measure such as changing the travel range from the left-turn side to the right-turn side, with the time until the lane is changed taken into consideration.

(Second modification)

The travel range specifying unit 10 may determine a travel range according to a travel position and travel conditions.

Figure 9B:
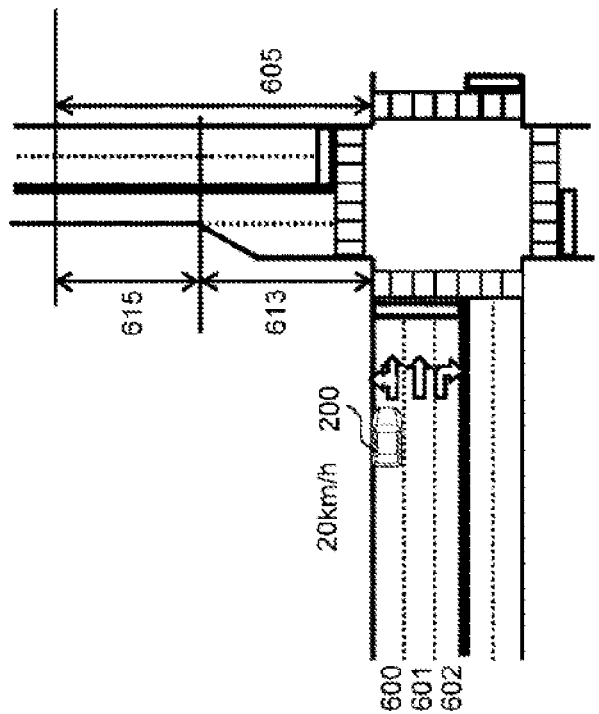
FIGS. 9A and 9B are diagrams illustrating an operating environment in a second modification.
Figure 9A:
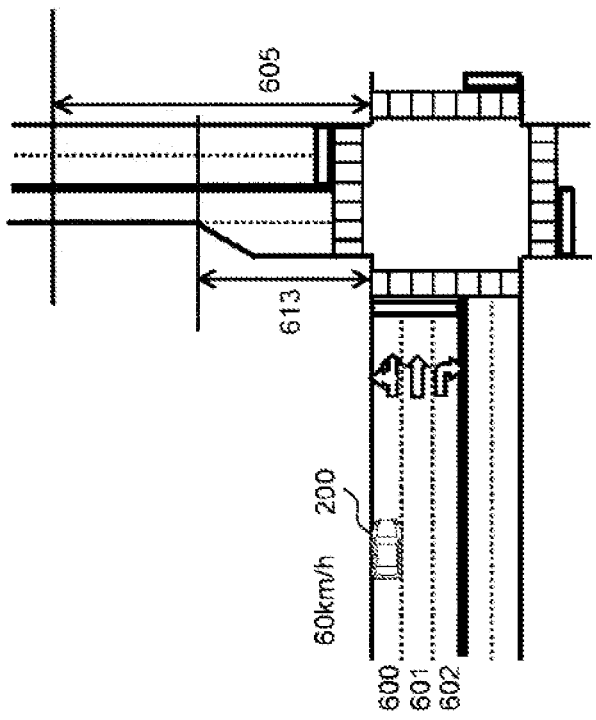

FIG. 9 is a diagram illustrating an operating environment in a second modification. In FIG. 9, the vehicle 200 is traveling toward an intersection. In FIG. 9(A), the vehicle 200 is traveling at 60 km/h, and in FIG. 9(B), the vehicle 200 is traveling at 20 km/h. Conditions illustrated in FIG. 9(B) are at a time later than conditions illustrated in FIG. 9(A), and the vehicle 200 has come closer to the intersection. In FIGS. 9(A) and 9(B), a travel range is calculated as indicated by reference numeral 605 by the method described in the first embodiment. Note that a road illustrated above in the figure can be classified into a range near the intersection indicated by reference numeral 613 and a range far from the intersection indicated by reference numeral 615.

In the conditions illustrated in FIG. 9(A), the vehicle 200 is traveling in the leftmost lane 600, and thus map information on the right-turn side of the intersection is not provided as in the first modification. When the vehicle 200 is traveling at 60 km/h as illustrated in FIG. 9(A), the vehicle 200 is highly likely to continue to travel straight through the intersection. In that case, the possibility of utilizing the travel range 605 off the planned route is low, so that the range near the intersection indicated by reference numeral 613 of the travel range 605 is set as a travel range. Note that when there is a change in the shape of the road, the travel range specifying unit 10 may determine the range indicated by reference numeral 613 so as to include the change. That is, in the example illustrated in FIG. 9(A), the range indicated by reference numeral 613 is determined so as to include a section in which lanes decrease.

In the conditions illustrated in FIG. 9(B), the speed of the vehicle 200 has been reduced from 60 km/h to 20 km, and the vehicle 200 is highly likely to turn left. Therefore, the travel range specifying unit 10 sets the entire range of reference numeral 605 including the range indicated by reference numeral 615 as a travel range.

(Third modification) The travel range specifying unit 10 may determine a travel range according to a travel position, travel conditions, and conditions of a planned route.

Figure 10:
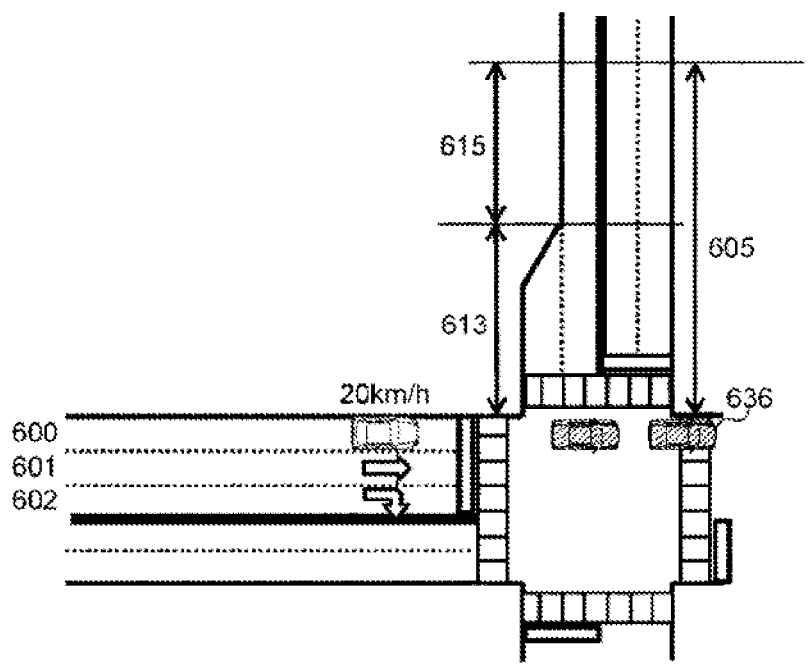
FIG. 10 is a diagram illustrating an operating environment in a third modification.

FIG. 10 is a diagram illustrating an operating environment in a third modification, which is similar to the condition illustrated in FIG. 9(B). The difference between FIG. 9(B) and FIG. 10 is that in FIG. 10, there are preceding vehicles 636 in an intersection. The speed of the vehicle 200 is 20 km/h, and the vehicle 200 is traveling toward the intersection. The vehicle, which has decelerated to 20 km/h near the intersection, may not turn left when the preceding vehicles 636 in the intersection are present. Thus, in this case, the travel range specifying unit 10 sets the range indicated by reference numeral 613 as a travel range.

(Fourth modification) In the first embodiment described above, the automatic driving control ECU 7 and the display ECU 8 store received surrounding road information in their respective storage areas, and refer to the stored surrounding road information as necessary. However, the automatic driving control ECU 7 and the display ECU 8 may not store surrounding road information. In this case, the vehicle surrounding information management device 1 continuously transmits surrounding road information at predetermined time intervals. Then, the automatic driving control ECU 7 and the display ECU 8 refer to newly received surrounding road information each time surrounding road information is needed. That is, in the present modification, the vehicle surrounding information management device 1 needs to determine the end of provision of surrounding road information. The following describes the timing when the vehicle surrounding information management device 1 stops providing surrounding road information.

When the vehicle surrounding information management device 1 determines that the vehicle 200 cannot travel along a planned route before entering an intersection, it outputs a route generation request to the navigation device 6. If the vehicle surrounding information management device 1 stops the provision of surrounding road information at a point in time when it receives new route information before the vehicle 200 enters the intersection, the vehicle 200 cannot continue automatic driving when it has no choice but to travel in a direction other than the planned route at the intersection. Thus, the vehicle surrounding information management device 1 stops providing surrounding road information when it is determined which road to travel at the intersection. For example, the vehicle surrounding information management device 1 continues to provide surrounding road information until the vehicle 200 passes through the intersection and goes over a pedestrian crossing, and stops providing surrounding road information when the vehicle 200 has passed through the pedestrian crossing.

(Fifth Modification)

In the embodiment described above, two ECUs, the automatic driving control ECU 7 and the display ECU 8, have been illustrated as the information provision destinations of the vehicle surrounding information management device 1. However, the information provision destinations of the vehicle surrounding information management device 1 may be changed depending on the purpose of use and the configuration of the vehicle. For example, a travel range, which is an output from the vehicle surrounding information management device 1, may be fed back to the map information provision device 4 to narrow down map information from the map information provision device 4 in advance.

(Six Modification)

A route generation request may be made in different modes, depending on the content of the request because the vehicle surrounding information management device 1 may want to acquire a route generation predicted time from the navigation device 6 before the necessity of route generation is confirmed. For example, a confirmation mode when the necessity of route generation is confirmed and a reservation mode when it is desired to acquire a route generation predicted time even if the necessity is not confirmed, are possible.

(Seventh Modification)

A route generation predicted time may be acquired before the necessity of route generation is confirmed. In this case, although route generation is not performed when route generation is requested in S5 of FIG. 5, a request in the reservation mode may be notified to the navigation device 6 for acquiring only a predicted time. In that case, when the necessity of route generation is confirmed, a request in the confirmation mode needs to be notified to the navigation device 6 when requesting route generation.

(Eighth Modification)

The timing when the necessity of route generation is confirmed varies depending on travel conditions and information provision devices mounted. For an intersection with poor visibility, detection by the external recognition sensors 3 may be delayed. In that case, if information is acquired by road-to-vehicle communication or the like, a route generation request can be made in advance. When road-to-vehicle communication is not installed, by making a route generation request in the reservation mode when the vehicle comes close to an intersection a certain distance, map information on fork roads can be obtained, enabling a preliminary preparation.

(Ninth Modification)

The in-vehicle system S may not include the automatic driving control ECU 7, and only the display ECU 8 may use surrounding road information. In this case, the display ECU 8 executes a collision avoidance application. The collision avoidance application first grasps the detailed position of an obstacle present in the vicinity based on surrounding road information. Then, the display ECU 8 grasps the detailed positional relationship between the vehicle 200 and the obstacle, based on outputs of the vehicle behavior recognition sensors 2 and the external recognition sensors 3, and gives a notice to the driver when there is a risk of collision, for example. In this case, the track planning distance calculation unit 302 performs calculation using a collision avoidance initialization time that is the time required for the display ECU 8 to start executing the collision avoidance application, instead of the route generation estimate acquisition time 13.

(Tenth Modification)

The predicted travel distance during route generation calculation unit 301 may calculate a predicted travel distance during route generation using only a route generation predicted time output by the navigation device 6, or may calculate a predicted travel distance during route generation only using the predetermined route generation estimate acquisition time 13.

(Eleventh Modification)

The travel range specifying unit 10 may not include the track planning distance calculation unit 302. In that case, the adjacent map provision distance calculation unit 303 outputs an output of the predicted travel distance during route generation calculation unit 301 as it is as a map provision distance.

(Twelfth Modification)

The predicted travel distance during route generation calculation unit 301 and the track planning distance calculation unit 302 may not perform multiplication using the vehicle speed. The adjacent map provision distance calculation unit 303 may compare times and then multiply a time by the vehicle speed. In this case, the predicted travel distance during route generation calculation unit 301 outputs the route generation estimate acquisition time 13 until a route generation predicted time is obtained, and outputs a route generation predicted time when the route generation predicted time is obtained. Also, in this case, the track planning distance calculation unit 302 outputs the track planning time 14. Then, the adjacent map provision distance calculation unit 303 multiplies the longer time of the times output by the predicted travel distance during route generation calculation unit 301 and the track planning distance calculation unit 302 by the vehicle speed, and outputs the result as a map provision distance.

Second Embodiment

Figure 11:
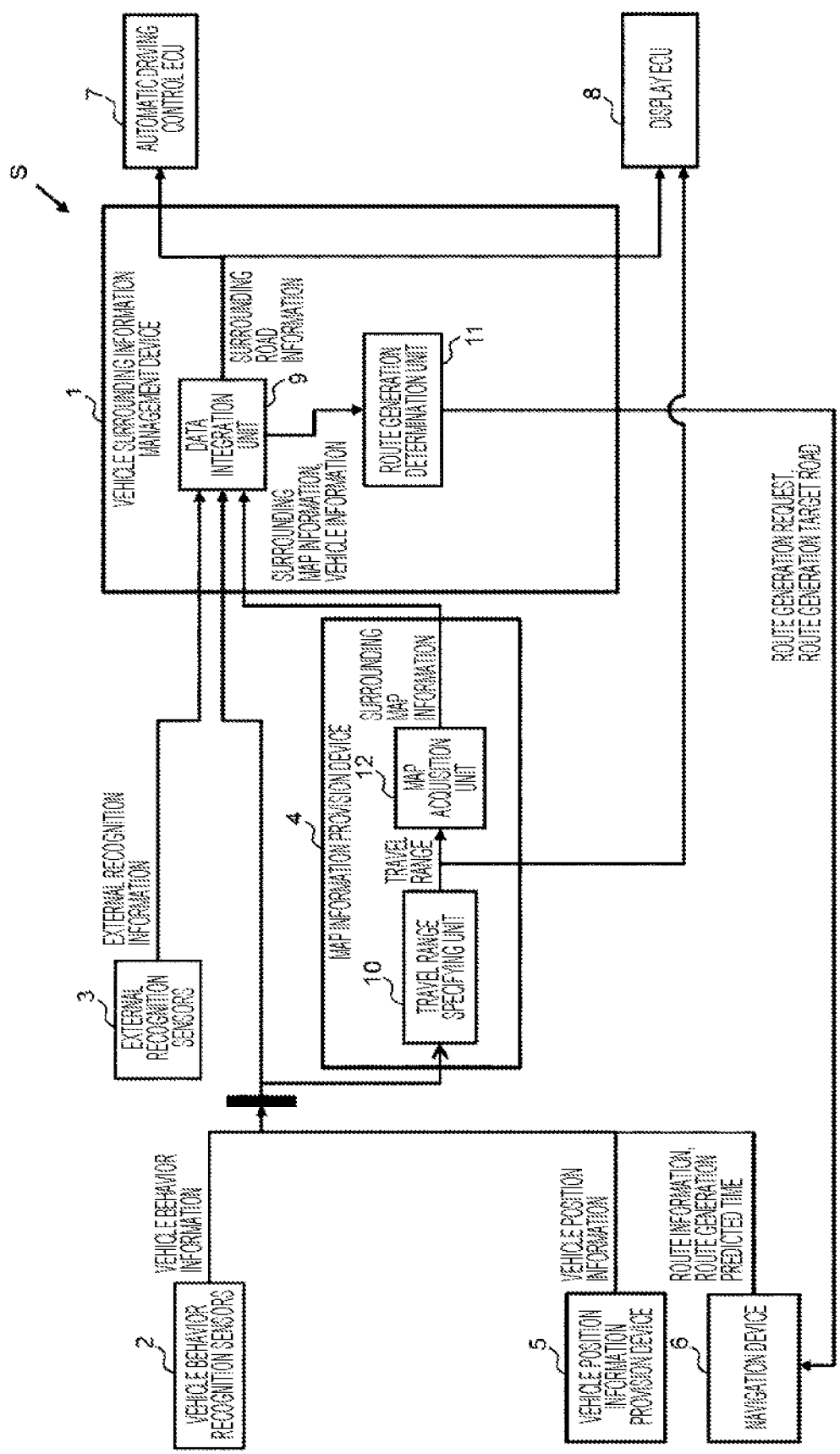
FIG. 11 is a system configuration diagram of an in-vehicle system S in a second embodiment.

With reference to FIG. 11, a second embodiment of a vehicle surrounding information management device that is an information management device will be described. In the following description, the same reference numerals are assigned to the same components as those in the first embodiment, and differences will be mainly described. Points not particularly described are the same as those in the first embodiment. The present embodiment is different from the first embodiment mainly in that a travel range specifying unit and a map acquisition unit are incorporated in a map information provision device.

FIG. 11 is a system configuration diagram of the in-vehicle system S in the second embodiment. In FIG. 11, the map information provision device 4 includes the travel range specifying unit 10 and the map acquisition unit 12. The map information provision device 4 acquires information from the vehicle behavior recognition sensors 2, the vehicle position information provision device 5, and the navigation device 6. The travel range specifying unit 10 of the map information provision device 4 calculates a travel range. This calculation method is the same as that of the first embodiment. The map acquisition unit 12 generates surrounding map information based on a travel range calculated by the travel range specifying unit 10, and provides the surrounding map information to the vehicle surrounding information management device 1. The surrounding map information is map information included in surrounding road information in the first embodiment. The vehicle surrounding information management device 1 integrates information from other sensors into surrounding map information received from the map information provision device 4 to generate surrounding road information, and outputs it to the automatic driving control ECU 7 and the display ECU 8.

According to the second embodiment described above, a flexible device configuration can be taken. In addition, a device having enough computing power can implement the functions of the travel range specifying unit 10 and the map acquisition unit 12 to level load.

(Modification of Second Embodiment)

When outputs of the external recognition sensors 3 are input not only to the vehicle surrounding information management device 1 but also to the map information provision device 4, the data integration unit 9 and the route generation determination unit 11 may also be included in the map information provision device 4. Alternatively, the automatic driving control ECU 7 may be configured to include the data integration unit 9, the travel range specifying unit 10, the route generation determination unit 11, and the map acquisition unit 12.

Although the programs are stored in the ROM (not illustrated), the programs may be stored in non-volatile memory (not illustrated). The vehicle surrounding information management device 1 may include an input/output interface (not illustrated), and the programs may be read from another device via the input/output interface and a medium that can be used by the vehicle surrounding information management device 1 when necessary. Here, the medium refers, for example, to a storage medium removably fitted in the input/output interface, or a communication medium, that is, a wired, wireless, or optical network, or the like, or carrier waves or digital signals propagating through the network. Some or all of the functions implemented by the programs may be implemented by a hardware circuit or an FPGA.

The embodiments and the modifications described above may be combined. Although the various embodiments and modifications have been described above, the present invention is not limited to their contents. Other embodiments conceivable within the scope of the technical idea of the present invention are also included within the scope of the present invention.

REFERENCE SIGNS LIST 1 vehicle surrounding information management device
4 map information provision device
6 navigation device
9 data integration unit
10 travel range specifying unit
11 route generation determination unit
12 map acquisition unit
13 route generation estimate acquisition time
14 track planning time
301 predicted travel distance during route generation calculation unit
302 track planning distance calculation unit
303 adjacent map provision distance calculation unit
304 travel range calculation unit

The invention claimed is:

1. An information management device, comprising:
a processor; and
a memory storage device in communication with the processor, the memory storage device storing a program comprising instructions executable by the processor to cause the information management device to:
determine that a vehicle, in which the information management device is disposed, needs to leave or has left a preset planned route on which the vehicle is traveling,
output a route generation request for a new planned route to a navigation device based on determining that the vehicle needs to leave or has left the preset planned route,
receive, from the navigation device, a time required to calculate the new planned route as a route generation predicted time,
determine a speed of the vehicle,
determine a travel range that the vehicle can travel off the preset planned route, wherein the travel range is calculated by the processor based on the route generation predicted time and the speed of the vehicle, and
transmit surrounding road information on a road within the travel range to an automatic driving control electronic control unit that controls movement of the vehicle based on the surrounding road information,
wherein the processor calculates the travel range based on a longer of a first distance and a second distance, the first distance being based on a processing time specific to an application that is provided with the surrounding road information to operate, and the second distance being based on the route generation predicted time.

2. The information management device according to claim 1, wherein
the processor uses a predetermined value to calculate the travel range until the route generation predicted time is obtained, and
the processor calculates the travel range using the route generation predicted time after the route generation predicted time is obtained.

3. The information management device according to claim 1, wherein
the processor calculates the travel range by subtracting a distance along which the planned route overlaps a map provision distance that is a product of the route generation predicted time and the speed of the vehicle, from the map provision distance.

4. The information management device according to claim 1, wherein the processor reduces the travel range based on at least one of a position of the vehicle on a road on which the vehicle travels, the speed of the vehicle, and a condition in a traveling direction of the vehicle.

\* \* \* \* \*